Patented July 5, 1960

2,943,939
CARBONATED BEVERAGES

Wesley N. Karlson, 1015 St. James Place, Park Ridge, Ill.

No Drawing. Filed Jan. 30, 1957, Ser. No. 637,096

4 Claims. (Cl. 99—28)

This invention relates to the making of carbonated water either in its unflavored form or its flavored form where it is usually known as a carbonated beverage or soft drink.

The making of carbonated beverages is, of course, carried on primarily as a local enterprise where the local supply of water must be used, and this causes a wide variety of problems to be encountered by the manufacturer or maker. In accordance with the most common practice, the local raw water is used and is converted into carbonated water through the introduction of carbon dioxide gas in an amount sufficient to give the desired degree of carbonation. Carbonated water is maintained in a confined state until it is to be used, and then when it is opened to the air, there is a marked effervescence which continues until practically all of the carbonation is lost. When it reaches this state, it is said to be flat, and one of the major problems involved in the production of carbonated water is to so produce the carbonated water that it retains its carbonation for a relatively long time. Usually this is accomplished by initially carbonating the water to a relatively high degree, and this, of course, involves added expense due to the additional carbon dioxide that is required.

In the making of carbonated water, it is customary to soften the water through the use of conventional means which usually takes the form of ion exchange water softeners, but even this does not result in carbonated water which has a high degree of retention in so far as the carbonation may be concerned, and it makes it necessary to use exceptionally large quantities of carbon dioxide gas to produce the desired degree of carbonation.

In view of the foregoing it is the primary object of the present invention to provide a new and improved method of making carbonated water which increases the retention of the carbonation, and under the present invention, this is accomplished in such a way that a material saving in carbon dioxide is achieved.

Other and further objects of the present invention will be apparent from the following description and claims which by way of example disclose a preferred method of accomplishing the purposes of the present invention, and what I now consider to be the best mode in which I have contemplated applying the principles that are applicable to this invention. Variations may be made in the disclosed method, and equivalent principles may be used, and changes may be made as desired by those skilled in the art without departing from the invention.

The present invention is concerned with the making of carbonated water whether it be made up initially as plain water or whether it be made up with a flavoring and coloring material for subsequent carbonation. Under the present invention the raw water that is to be used is treated in accordance with its normal content of objectionable mineral and metallic elements, and in this treatment these objectionable elements are rendered ineffective by being sequestered and inactivated and kept in a permanent solution and suspension in the water, and this treatment will be described in some detail hereinafter. The treatment is carried out by introducing into the raw water a water soluble sodium polyphosphate that has a molar composition about midway in the glass-forming range. The sodium polyphosphate material that is used has a empirical formula of $Na_{12}P_{10}O_{31}$, and includes substantially 63.5 percent of $P_2O_5$. The pH of a 1% solution of such sodium polyphosphate is approximately 7.2, and it is thus substantially neutral and when added to the water does not appreciably change its pH value.

While some variations may be made in the molar composition of the sodium polyphosphate, I prefer to use such a material that has a molar composition of $1.2Na_2O:1P_2O_5$. Through the use of a sodium polyphosphate material having such a molecular ratio that is substantially midway in the glass-forming range, the material is rendered highly stable against reversion.

In such treatment of the raw water the sodium polyphosphate material is introduced into the water in a particular proportion that is based primarily upon the original content of iron and other metallic ions, and in this treatment a limited excess of the treating material is introduced as will be explained. While such treatment may be accomplished by a manual batch proportioning operation, I prefer to use the automatic proportioning structure disclosed in my co-pending application Serial No. 569,808, filed March 6, 1956, and with this feeder the desired proportional treatment is accomplished automatically.

In determining the proportioning that is to be used, the primary basis is the iron content of the raw water, but it is often found that other metallic ions such as copper, magnesium, nickel and zinc may be present in sufficient quantities to necessitate taking these other metallic ions into consideration. These other metallic ions are, however, usually present in such limited quantities that the determination of the amount of treating material to be used may be based on the iron content of the raw water. Such iron content may be determined by titration or other known methods to give the number of parts per million of iron that are present in the water.

To sequester one part per million of iron in the raw water requires three parts per million of the aforesaid sodium polyphosphate material. Thus, the number of parts per million of iron that is present in the raw water is multiplied by three to give the number of parts per million of the sodium polyphosphate material that will be required for sequestering and inactivating the iron. In addition to this theoretical proportion, I find that a slight excess of the polyphosphate material should be used, and when the total amount thus determined is added to the raw water, I have discovered that the calcium and magnesium components of hardness, and also the iron in the raw water are effectually sequestered and inactivated. In practice I add an excess of two parts per million of the polyphosphate material to the amount that has been calculated upon the basis of the iron content. This excess, however, is under the present invention, limited so that the total amount of polyphosphate material added to the raw water does not exceed ninety parts per million.

When the water that has thus been treated is utilized in the making of carbonated water I have found that the amount of carbon dioxide required to give a particular degree of carbonation is reduced from 25 to 90 percent or more, and when the resulting carbonated water is released to atmospheric pressure it has been found that the carbonation is retained for from ten to fifteen times longer over than where carbonated water is prepared according to the usual practice.

While I have no theoretical explanation of the reason for such longer retention, and for such reduction in the amount of carbon dioxide required, it is my present belief that the sequestering and inactivating of the calcium and magnesium elements of hardness in the water prevents chemical reaction between these elements and the carbon dioxide that is introduced, and thus dissipation of the carbon dioxide is prevented.

From the foregoing description it will be apparent that the present invention enables carbonated water to be produced more economically and in such a way that the retention of the carbonation is materially extended.

Thus, while I have described my preferred method it is to be understood that changes and variations may be made by those skilled in the art without departing from the spirit and scope of the appended claims.

I claim:

1. The method of producing carbonated water which consists in treating the raw water to be used with a water soluble glassy sodium polyphosphate of a molar composition substantially midway of the glass-forming range as a treating material in a proportion equal to three parts per million of the treating material for each part per million of metallic ion content of the raw water plus an excess of treating material equal to substantially two parts per million, and introducing carbon dioxide into such treated water.

2. The method of producing carbonated water which consists in treating the raw water to be used with a water soluble glassy sodium polyphosphate of a molar composition substantially midway of the glass-forming range as a treating material in a proportion equal to three parts per million of the treating material for each part per million of metallic ion content of the raw water plus an excess of treating material equal to substantially two parts per million; the total amount of treating material thus used being not substantially more than ninety parts per million in respect to the water thus treated, and introducing carbon dioxide into such treated water.

3. The method of making carbonated water which consists in treating the water to be used with water-soluble glassy sodium polyphosphate of a molar composition of substantially $1.2Na_2O:1.0P_2O_5$ in a proportion that is slightly more than three times the total iron and other metallic content of the water, and subsequently introducing carbon dioxide gas into the treated water.

4. The method of making carbonated water which consists in treating the water to be used with water-soluble glassy sodium polyphosphate of a molar composition that is substantially midway of the glass-forming range and in a proportion that is so related to the metallic ion content of the water as to be just slightly more than sufficient to sequester and inactivate all of the metallic ions present in the water, and subsequently introducing carbon dioxide gas into the treated water to produce the desired degree of carbonation.

References Cited in the file of this patent

UNITED STATES PATENTS

| | | |
|---|---|---|
| 2,118,184 | Fronmuller | May 24, 1938 |
| 2,405,861 | Tod | Aug. 13, 1946 |
| 2,665,211 | Roland | Jan. 5, 1954 |

OTHER REFERENCES

Wallerstein Laboratories Communications, December 1956, vol. XIX, No. 67, pp. 345 to 370, article titled, Metal Induced Wildness in Beers, by P. P. Gray and I. Stone.